United States Patent [19]
Schmitt et al.

[11] Patent Number: 6,029,365
[45] Date of Patent: Feb. 29, 2000

[54] MACHINE FOR PRODUCING A SHEET

[75] Inventors: Anton Schmitt, Heidenheim; Thomas Mack, Sontheim, both of Germany

[73] Assignee: Voith Sulzer Papiermaschinen GmbH, Heidenheim, Germany

[21] Appl. No.: 08/813,492

[22] Filed: Mar. 7, 1997

[30] Foreign Application Priority Data

Mar. 9, 1996 [DE] Germany .......................... 196 09 213

[51] Int. Cl.[7] .................................................. F26B 11/04
[52] U.S. Cl. .............................................. 34/121; 384/558
[58] Field of Search ............................ 34/115, 116, 117; 384/557, 558

[56] References Cited

U.S. PATENT DOCUMENTS

| | | | |
|---|---|---|---|
| 1,547,071 | 7/1925 | Shartle | 34/113 |
| 4,705,411 | 11/1987 | Kellstrom | 384/450 |
| 5,061,087 | 10/1991 | Roerig et al. | 384/192 |
| 5,177,880 | 1/1993 | Preisetanz et al. | 34/117 |

FOREIGN PATENT DOCUMENTS

| | | |
|---|---|---|
| 394870B | 7/1992 | Austria . |
| 4445123 | 6/1996 | Germany . |
| 921296 | 3/1963 | United Kingdom . |

*Primary Examiner*—Pamela A. Wilson
*Attorney, Agent, or Firm*—Greenblum & Bernstein, P.L.C.

[57] ABSTRACT

A machine for producing a sheet, e.g., paper or cardboard, in which the machine may include a plurality of rolls having a bearing pin located at each end and a bearing device retaining each bearing pin. The bearing device may be utilized to guide the bearing pin on all sides, enabling a base of the bearing device to be arbitrary positioned at an angle $0°<\alpha<90°$ with respect to a horizontal reference, e.g., the ground or a base surface. The plurality of rolls may include dryer cylinders and/or sheet guide rolls.

8 Claims, 3 Drawing Sheets

MACHINE FOR PRODUCING A SHEET

CROSS-REFERENCE OF RELATED APPLICATION

The present invention claims the priority under 35 U.S.C. §119 of German Patent Application No. 196 09 213.2 filed on Mar. 9, 1996, the disclosure of which is expressly incorporated by reference herein in its entirety.

BACKGROUND OF THE INVENTION

1. Field of the Invention

The present invention relates to a machine for producing a sheet, e.g., paper or cardboard, in which the machine may include a plurality of rolls having a bearing pin located at each end and a bearing device retaining each bearing pin. The bearing device may be utilized to guide the bearing pin on all sides, enabling a base of the bearing device to be arbitrary positioned at an angle $0°<\alpha<90°$ with respect to a horizontal reference, e.g., the ground or a base surface.

2. Discussion of the Background Information

U.S. Pat. No. 5,177,880 discloses a sheet producing machine similar in general to the sheet producing machine referred to above. The prior art machine includes a number of rolls, e.g., press rolls, drying cylinders, and/or sheet guide rolls, which are secured by a bearing device at each end. The bearing devices are attached to a foundation by a seating comprised of a number of carriers that extend vertically and horizontally, and to which the bearing devices are attached. The carriers that secure a roll bearing device run horizontally, i.e., substantially parallel with respect to the ground or support structure for the machine. In particular, if it is desired to position rolls of a sheet producing machine in different horizontal and/or vertical planes, more costly carrier structures are required in order to attach the roll bearing devices.

SUMMARY OF THE INVENTION

An object of the present invention may be to produce a paper producing machine which does not suffer from the above disadvantages of the prior art machines.

Accordingly, the present invention discloses a machine for producing a sheet, e.g., paper or cardboard, having a plurality of rolls, each roll having a bearing pin located at each respective roll end, and a bearing device that holds each respective bearing device. Due to the at least one bearing device guiding and supporting the associated bearing pin of the roll on all sides, i.e., 360°, a base of the bearing device may be positioned at an arbitrary angle $0°<\alpha<\pi°$ with respect to the horizontal reference, e.g., the ground or a machine support surface. Thus, according to the present invention, the bearing devices may be affixed to a diagonally extending surfaces of a seating, which may eliminate specialized carrier devices of the prior art which necessitated locating a plurality of horizontal support faces within different planes for retaining the roll bearing devices.

Accordingly, the present invention may be directed to a machine for producing a sheet that may include a plurality of rolls in which each roll may include a bearing pin associated with each respective end; a bearing device associated with each bearing pin; at least one of the bearing devices may include a guiding element to guide the bearing pin on all sides; and a bearing base located at a predetermined angle a between approximately 0 and 90° with respect to a horizontal axis.

In accordance with another feature of the present invention, the bearing device further include at least two bearing rings that are shiftable relative to each other in a direction of a rotational axis of a respective one of the plurality of rolls.

In accordance with another feature of the present invention, the bearing device further include bearing rings having central axes forming an angle ($\delta$) therebetween.

In accordance with a further feature of the present invention, at least one carrier device may form part of a V-shape; the bearing device may be affixed to the carrier; and the at least one carrier may be located at a predetermined angle $\beta$, with respect to the horizontal reference.

In accordance with still another feature of the present invention, the plurality of rolls may include at least one of drying cylinders and sheet guide rolls.

The present invention may also be directed to a sheet producing machine that may include a plurality of rolls in which each roll has a bearing pin located at each end; a plurality of bearing devices in which each bearing device may retain and guide all sides of a respective bearing pin; and two support structures parallely positioning each of the plurality of rolls within a different horizontal plane.

In accordance with another feature of the present invention, the two support structures may be arranged parallel to each other and at a predetermined angle to a horizontal reference.

In accordance with still another feature of the present invention, the predetermined angle may be between 0 and 90°.

In accordance with a further feature of the present invention, a predetermined number of the plurality of bearing devices may be mounted to each of said two support structures; and each of the bearing devices may include a base mounted at an angle substantially similar to the predetermined angle.

In accordance with a still further feature of the present invention, each bearing device may include an inner and an outer bearing ring; and the outer ring may have a first axis and the inner bearing ring may have a second axis that is movable with respect to the first axis.

In accordance with still another feature of the present invention, the first and second axis may form a deflection angle when a one of the bearing pins is deflected by a respective roll.

In accordance with another feature of the present invention, the deflection angle may be between 0 and approximately 0.5°.

In accordance with a still further feature of the present invention, the inner bearing ring may be immobile with respect to a longitudinal axis of the bearing pin.

In accordance with another feature of the present invention, the outer bearing ring may be movable with respect to a longitudinal axis of the bearing pin.

In accordance with still another feature of the present invention, the bearing device may further include a roller bearing layer disposed between the inner and the outer bearing rings.

In accordance with yet another feature of the present invention, each bearing device may guide an entire outer circumference of the respective bearing pin.

Further embodiments and advantages can be seen from the detailed description of the present invention and the accompanying figures.

BRIEF DESCRIPTION OF THE DRAWINGS

The present invention is further described in the detailed description which follows, in reference to the noted drawings by way of non-limiting examples of preferred embodiments of the present invention, and wherein.

DETAILED DESCRIPTION OF THE PREFERRED EMBODIMENTS

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawings making apparent to those skilled in the art how the several forms of the invention may be embodied in practice.

Figure 1:
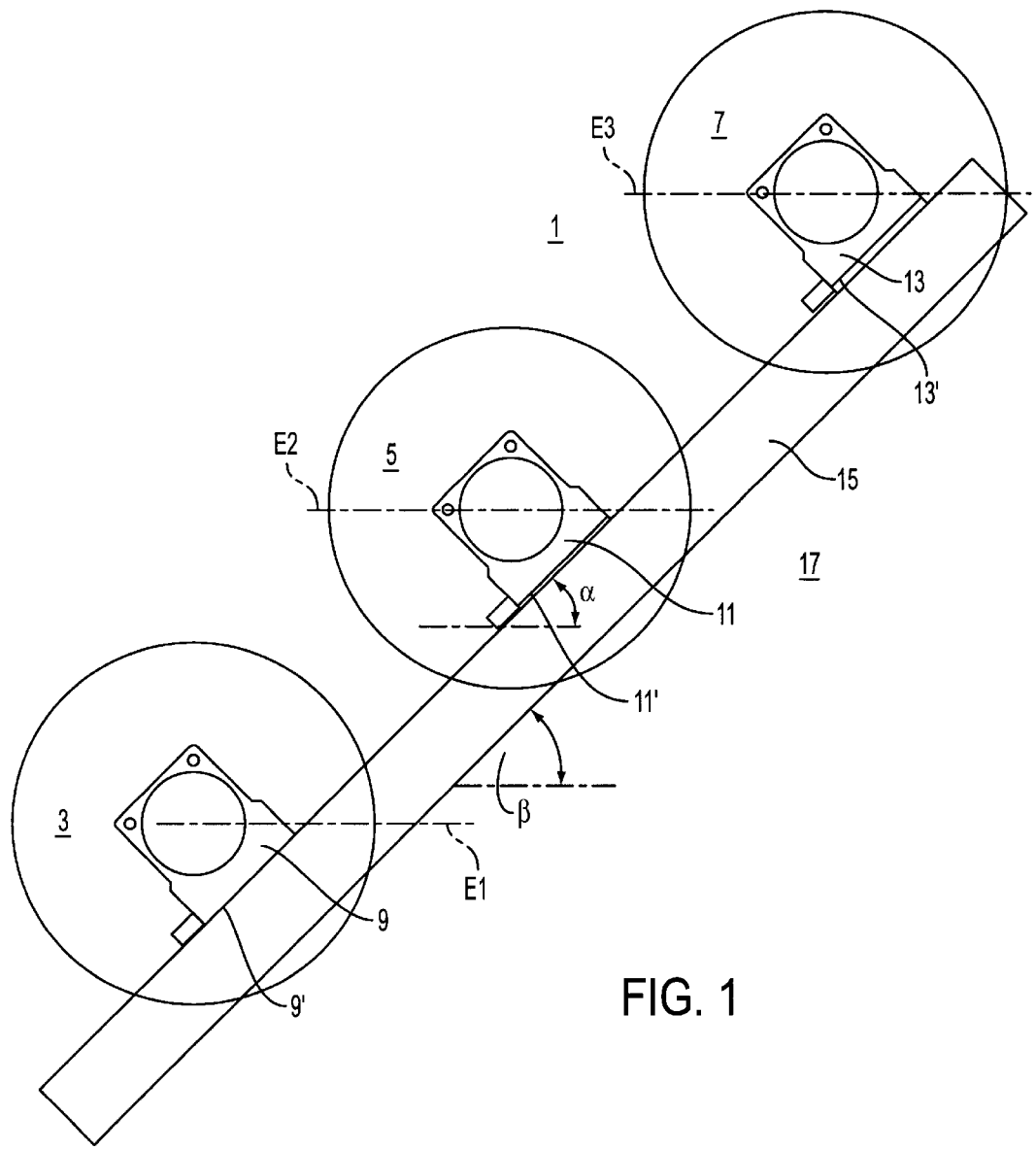
FIG. 1 illustrates a schematic side view of a portion of a machine for producing a sheet.

An exemplary portion of a machine for producing a sheet, e.g., paper or cardboard, may be illustrated as shown in FIG. 1. The machine may include a plurality of rolls, e.g., drying cylinders combined and located within at least one dryer group. The sheet (not shown), and optionally a belt, e.g., a drying screen, or felt, may be guided around the rolls in a meandering or winding manner. Alternatively, the rolls may comprise sheet deflecting rolls.

A portion 1 of the sheet producing machine, e.g., a drier group, may include a plurality of rolls or drying cylinders which may be positioned in a V-shape. While the exemplary illustration of portion 1 shows only one leg of a V-shape, the arrangement of further legs with respect to the portion shown are within the skill of the ordinarily skilled artisan. Portion 1 shows a plurality of rolls, e.g., drying cylinders 3, 5, and 7 which are mounted so that a material or sheet, not shown, may be guided therearound. The V-shaped, utilized for mounting the drying cylinders, may advantageously reduce the length of the paper making machine, accordingly, reducing costs for construction and maintenance.

Each drying cylinder 3, 5, and 7 may include a bearing device located at each end thereof. For example, for the drying cylinder ends shown in FIG. 1, drying cylinders 3, 5, and 7 may include bearing devices 9, 11, and 13, respectively, attached to a carrier device comprising a support beam 15 which may be a portion of a seating 17. Support beam 15 may be positioned within portion 1 at a predetermined angle $\beta$, e.g., approximately $10° \leq \beta \leq 80°$, and preferably approximately $25° \leq \beta \leq 60°$ or $35° \leq \beta \leq 50°$, relative to a predetermined horizontal reference, e.g., the ground or a base of the dryer portion. In the exemplary embodiment, predetermined angle $\beta$ may be, e.g., approximately 45°. A base of each bearing device 9, 11, and 13 i.e., bearing base 9', 11', and 13', respectively, may be positioned parallel to a supporting surface of support beam 15, i.e., at a predetermined angle $\alpha$, approximately 45°. As shown in FIG. 1, each center point of drying cylinders 3, 5, and 7 may be located within a separate horizontal plane, e.g., planes E1, E2, and E3, which are displaced vertically from each other. In a conventional seating of rolls, three horizontally extending support beams would be required, and, upon each support beam a separate conventional bearing device would have to be attached in order to simulate the V-shaped disposition of the drying cylinders 3, 5, and 7 of the present invention.

The bearing devices 9, 11, and 13 of the present invention lead to a significant simplification of seating 17 and, accordingly, an improvement to maintenance and repair work.

Figure 2:
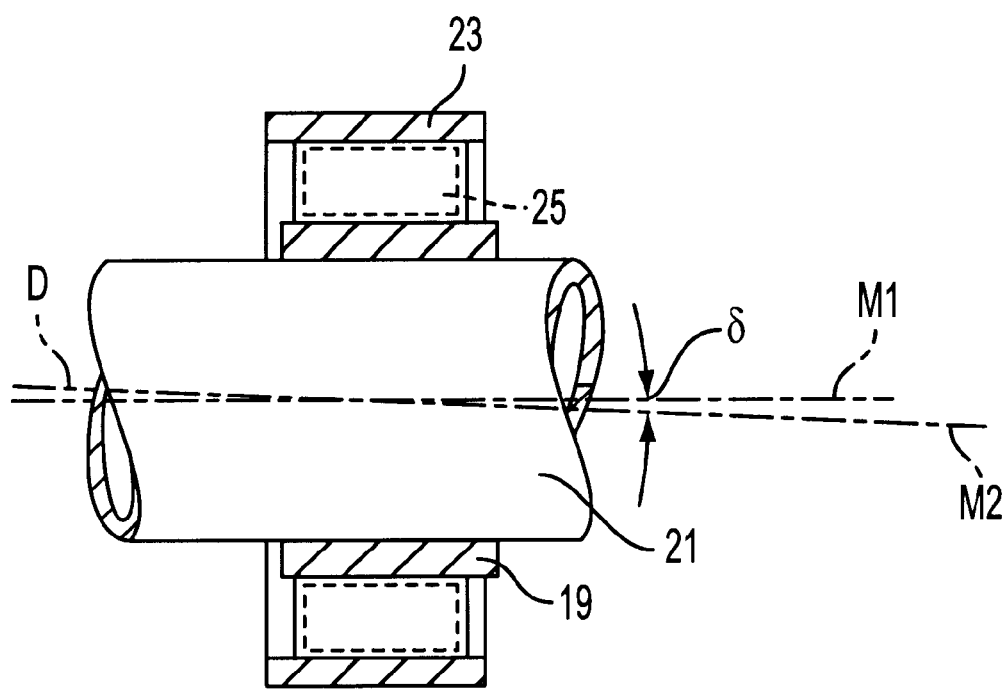
FIG. 2 illustrates a schematic diagram of a bearing device shown in cross section.
Figure 2A:
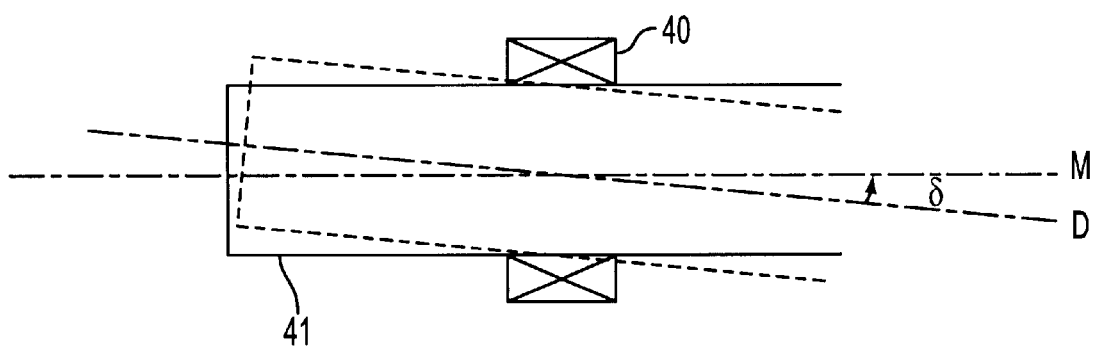
FIG. 2A schematically illustrates a bearing device for providing angular deflection of the bearing pin.

The structure of bearing devices 9, 11, and 13, which may be of identical construction, are schematically illustrated in FIG. 2A, which shows, generally, a single bearing device 40 providing support around a schematically depicted bearing pin 41, and which shows that bearing 40 allows an angular deflection or shift of bearing pin 41 from a non-deflecting central axis M to a deflection axis D, e.g., a deflection of angle $\delta$. FIG. 2 shows a more detailed view of the single bearing device that may include two substantially concentrically positioned bearing rings. An inner bearing ring 19 may rest against a shaft journal or bearing pin 21 of the drying cylinder and an outer bearing ring 23 may be coupled to a housing, not shown, of the bearing device and may be fixed to a bearing device base, not shown. Between inner and outer bearing rings 19 and 23, suitable bearing elements 25 (shown in dashed lines), e.g., roller bearings, may be provided to enable angular deflection or shift of angle $\delta$ of bearing pin 21, angular deflection or shift of bearing rings 19 and 23 relative to each other, and to ensure support of inner and outer bearing rings 19 and 23 on all sides, i.e., 360°. Because the inner and outer bearing rings are supported on all sides, the base of the bearing device may be positioned at any arbitrary angle, and particularly at predetermined angle $\alpha$. Any weight introduced into the bearing device through bearing pin 21 may be absorbed on all sides by the bearing device housing and may be transmitted to the bearing device base.

FIG. 2 shows that the bearing device may be designed so that the two bearing rings can be shifted relative to each other in a direction of rotational axis D of bearing pin 21. That is, the relative movement may be illustrated by considering a central axis M2 of inner bearing ring 19 (which may coincide with rotational axis D of bearing pin 21) and a central axis M1 of outer bearing ring 23. Movement of inner bearing ring 19 relative to outer bearing ring 23 may enclose or form an angle $\delta$, e.g., approximately 0.5°.

With regard to FIG. 2, it may be assumed that central axis M1 of outer bearing ring 23 may extend horizontally. Rotational axis D of bearing pin 21 may not be shifted or pivoted relative to central axis M1 as depicted in FIG. 2. In this instance, central axis M2 of inner bearing ring 19, coincides with rotational axis and central axis M1, i.e., there is no deflection of bearing pin 21. However, for the depicted instance, the dashed line corresponding to central axis M2 forms angle $\delta$, with respect to central axis M1, when bearing pin 21 is deflected or shifted, e.g., due to flexing of the cylinder held by the bearing device.

The bearing device according to the present invention may be used for bearing drying cylinders as well as sheet guide rollers. The bearing device of the present invention may be utilized wherever support of a roll on all sides is required and/or a simplification of the seating is sought. The base of the bearing device can be disposed on a diagonal at an angle of approximately $0° < \alpha < 90°$ in relation to a predetermined horizontal reference.

The guidance and support of bearing pin 21 on all sides within the bearing device produces a tremendous number of installation possibilities so as to permit the design of a simplified seating. Due to the internal structure of the bearing devices of the present invention, assembly tolerances, e.g., thermal expansions (particularly in drying cylinders), may be optimally absorbed without excessively loading the bearing and the seating. The machine for producing a sheet, therefore, may be designed very simply, compactly, and inexpensively. Since the accessibility of the individual parts of the machine, e.g., ductor devices, is significantly increased by the present invention, the seating may be simplified to produce considerable advantages related to maintenance and control work inside the machine.

Accordingly, the use of the bearing devices described herein may produce extensive possibilities for significantly simplifying the seating of a machine for producing a sheet or a paper making machine.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular means, materials and embodiments, the invention is not intended to be limited to the particulars disclosed herein; rather, the invention extends to all functionally equivalent structures, methods and uses, such as are within the scope of the appended claims.

What is claimed is:

1. A machine for producing a sheet comprising:
   a plurality of rolls, each roll including a bearing pin associated with each respective end of the plurality of rolls;
   a bearing device associated with each bearing pin;
   at least one of said bearing device being formed to guide the bearing pin on all sides; and
   a bearing base of the bearing pin located at a predetermined angle $\alpha$ between approximately 0° and 90° with respect to a horizontal axis.

2. The machine according to claim 1, the bearing device further comprising at least two bearing rings that are shiftable relative to each other in a direction of a rotational axis of a respective one of the plurality of rolls.

3. The machine according to claim 1, the bearing device further comprising bearing rings having central axes forming an angle ($\delta$) therebetween.

4. The machine according to claim 1, further comprising at least one carrier device for forming part of a V-shape;
   the bearing device being affixed to the carrier; and
   the at least one carrier located at a predetermined angle $\beta$, with respect to the horizontal reference.

5. The machine according to claim 4, wherein angle $\alpha$ and angle $\beta$ are substantially similar.

6. The machine according to claim 1, the plurality of rolls comprising at least one of drying cylinders and sheet guide rolls.

7. The machine according to claim 1, the predetermined angle $\alpha$ being between greater than 0° and approximately 90° with respect to a horizontal axis.

8. The machine according to claim 1, wherein the plurality of rolls are composed of rotatable rolls.

* * * * *